United States Patent [19]
Taguchi et al.

[11] Patent Number: 5,707,672
[45] Date of Patent: Jan. 13, 1998

[54] METHOD FOR STERILIZING AND PACKAGING SOLID FOODS

[75] Inventors: Masao Taguchi; Yoshitaka Hirano, both of Chiba; Koji Sengoku, Shisui-machi; Masayuki Nakatani, Nagoya; Mahito Orii, Chiba; Akifumi Fujita, Ichihara, all of Japan

[73] Assignee: House Foods Corporation, Higashi-Osaka, Japan

[21] Appl. No.: 519,806

[22] Filed: Aug. 24, 1995

[51] Int. Cl.$^6$ ........................................... A23C 3/16
[52] U.S. Cl. .................... 426/399; 426/521; 422/26
[58] Field of Search ........................ 426/392, 399, 426/407, 511, 521, 584; 99/470, 483, 361, 359, 367, 371; 422/26

[56] References Cited

U.S. PATENT DOCUMENTS

| | | | |
|---|---|---|---|
| 2,144,334 | 1/1939 | Kennedy | 426/407 X |
| 3,951,131 | 4/1976 | Houfek | 426/511 |
| 4,195,061 | 3/1980 | Kalasek | 422/109 |
| 4,196,225 | 4/1980 | Mencacci | 426/523 |
| 4,346,650 | 8/1982 | Zaitsu | 426/407 X |
| 4,636,395 | 1/1987 | Robinson, Jr. et al. | 426/521 |
| 4,646,629 | 3/1987 | Creed et al. | 99/470 X |
| 4,773,321 | 9/1988 | Wijts | 99/470 |
| 4,962,700 | 10/1990 | Skobic et al. | 99/470 |
| 5,320,856 | 6/1994 | Sergio et al. | 426/392 |
| 5,452,649 | 9/1995 | Taguchi et al. | 99/470 |
| 5,545,854 | 8/1996 | Nakatani et al. | 99/470 |
| 5,587,194 | 12/1996 | Nakatani et al. | 426/521 |
| 5,617,781 | 4/1997 | Nakatani et al. | 99/470 |

FOREIGN PATENT DOCUMENTS

| | | |
|---|---|---|
| 2559354 | 8/1985 | France . |
| 55-96080 | 7/1980 | Japan . |
| 4-370081 | 12/1992 | Japan . |

*Primary Examiner*—Milton Cano
*Attorney, Agent, or Firm*—Oblon, Spivak, McClelland, Maier & Neustadt, P.C.

[57] ABSTRACT

A method for sterilizing and packing a solid food comprises the steps of charging a solid food in a retainer, whose upper portion is opened, in a layer having an approximately uniform thickness, sterilizing the retainer through heating, cooling it with cooling air and/or cooling water, transferring the solid food contained in the retainer to a sterilized packaging container and then aseptically sealing the container. The method permits efficient and rapid heating and cooling of a solid food because of the direct contact between steam or cooling air and/or cooling water and the food without causing a problem such that the packaging container becomes dirty during the sterilization through heating and does not give out any remaining bad smell. Therefore, excess softening and/or destruction of the solid foods as well as any deterioration thereof due to decomposition and alteration of the nutritive substances and flavoring substances present therein can thus be limited to the lowest possible level.

6 Claims, No Drawings

METHOD FOR STERILIZING AND PACKAGING SOLID FOODS

BACKGROUND OF THE INVENTION

The present invention relates to a method for sterilizing solid foods such as cooked rice; various kinds of noodles; pasta; and vegetables and meat as well as processed products thereof and for packaging them in containers and in particular to a method for sterilizing and packaging suitably applied to the production of shelf stable cooked foods which are packed in containers.

The shelf stable cooked foods packed in containers have conventionally been prepared by a variety of methods. For instance, Japanese Un-Examined Patent Publication (hereinafter referred to as "J. P. KOKAI") No. Sho 55-96080 discloses a method for preparing a shelf stable cooked food which comprises the steps of introducing ingredients for the food together with a required amount of water in a container having an opening, heating the container for a time and at a temperature required for the sterilization thereof and sealing the opening of the container under aseptic conditions after completion of the sterilization. Moreover, J. P. KOKAI No. Hei 4-370081 discloses a method for aseptically processing and packaging a food which comprises the steps of charging ingredients for the food in a container, then sterilizing the packaged ingredients through heating under press and then sealing the container under aseptic conditions.

However, these methods suffer from a problem in that the packaging containers become dirty during the sterilization treatment through heating since the containers also serve as containers for sterilization through heating. In addition, the containers for packaging must withstand the conditions for sterilization through heating under pressure.

SUMMARY OF THE INVENTION

Accordingly, an object of the present invention is to provide a method for sterilizing and packaging solid foods, which does not suffer from the problem that a packaging container becomes dirty during a sterilization treatment through heating and which permits effective sterilization within a short period of time and likewise permits effective packaging of the food in the container.

Another object of the present invention is to provide a method for sterilizing and packaging solid foods, which does not require the use of any packaging container capable of withstanding the conditions for sterilization through heating under pressure.

The present invention has been developed on the basis of such a knowledge that the foregoing problems can effectively be solved by charging a solid food in a retainer, whose upper portion is opened, in the form of a layer having an approximately uniform thickness, sterilizing the food in the retainer through heating, cooling it, transferring the solid food contained in the retainer to a sterilized packaging container and then aseptically sealing the container.

According to the present invention, there is thus provided a method for sterilizing and packing a solid food which comprises the steps of charging a solid food in a retainer, whose upper portion is opened, in the form of a layer having an approximately uniform thickness after an optional preliminary cooking through heating, sterilizing the food contained in the retainer through heating, cooling it with cooling air and/or cooling water, transferring the solid food contained in the retainer to a sterilized packaging container and then aseptically sealing the container.

DESCRIPTION OF THE PREFERRED EMBODIMENTS

The present invention will hereinafter be described in more detail.

The solid foods to be processed by the method of the present invention are not restricted to specific ones, but representative examples thereof include cooked rice such as plain rice, seasoned rice and cooked rice with red beans; various kinds of noodles such as wheat vermicelli, buckwheat vermicelli, thin and wide wheat vermicelli (Kishimen) and Chinese noodles; pasta such as spaghetti and macaroni; vegetables and meat as well as processed products thereof such as meat balls, fried soybean curd and fried Kamaboko.

The foregoing solid foods each is first charged in a retainer, whose upper portion is opened, in the form of a layer having an approximately uniform thickness after an optional preliminary cooking through heating or without such preliminary cooking.

In this respect, the preliminary cooking through heating for cooked rice may comprises, for instance, immersing cleansed rice in water and then steaming the same, which may optionally be mixed with ingredients and then baked or fried. On the other hand, the preliminary cooking for noodles may comprises, for instance, preliminarily steaming raw noodles under ordinary pressure, optionally disentangling a wad of noodles through pulling and applying a small amount of oil onto the surface of the noodles. Moreover, the preliminary cooking for pasta comprises, for instance, boiling spaghetti or the like to such an extent that it is still slightly hard and optionally adding salad oil to prevent mutual sticking thereof or, if desired, further mixing it with ingredients. In case of vegetables, the preliminary cooking comprises, for instance, cutting them in pieces having a desired size, then heating them in boiling water to prevent enzymatic browning; or, in case of beans, the process comprises immersing them in water and then heating in gently boiled water to make them soft. In case of meat, the preliminary cooking comprises, for instance, sauting in the presence of oil till the meat is burnt brown to thus impart good flavor and taste thereto. It is also possible to give them light seasoning during the preliminary processing thereof using common salt, sugar and/or seasonings.

The retainer whose upper portion is opened may be any one so far as the upper portion thereof is opened, but may preferably be square-shaped retainers whose side walls are perpendicular to the bottoms and retainers whose side walls make a desired angle with respect to the bottoms in such a manner that the width thereof is upwardly increased. However, the shape thereof is not restricted to the square shape, but may be those having circular and elliptic cross-sections. In addition, the depth of the retainer may vary depending on the width and may be arbitrarily determined, but preferably ranges from 30 to 100 mm. Moreover, it is preferred to form a plurality of holes through the bottom of the retainer having such a size that solid foods cannot pass therethrough. In particular, the perforation of the retainer is preferably carried out in such a manner that the sum of the areas of the holes formed ranges from 10 to 60% of the whole area of the bottom. Moreover, the retainer may have such holes on the side walls. The retainer may be formed from any material, for instance, metals such as stainless steel and plastics, but the use of metals permits rapid heating and cooling of the content because of their high heat conductivity.

According to the present invention, a solid food is charged in such a retainer having an opened upper portion in the form of a layer having an approximately uniform thickness, then sterilized through heating and cooled with cooling air and/or cooling water. The sterilization through heating may be performed by any method commonly used, but may preferably be carried out using pressurized steam because of its high heat transfer rate and good sterilizing effect. It is also possible to use superheated steam for the purpose of preventing dewing due to the condensation of steam on the solid food surface. The solid food to be processed is preferably heated to a temperature ranging from 110° to 135° C. during the sterilization treatment. On the other hand, the heating time varies depending on the size of the solid food to be sterilized, but the solid food is preferably heated for a time required for achieving commercial sterility level at the center of the solid food, i.e., it ranges from 1 to 10 minutes.

On the other hand, the cooling of the solid food is carried out using cooling air and/or cooling water and the solid food thus sterilized is preferably cooled down to a temperature ranging from 10° to 90° C. Incidentally, "Kansui" (brine used for the production of chinese noodles) may be sprinkled in place of cooling water in case of chinese noodles in order to impart the color and flavor and taste peculiar to the noodles.

In the present invention, the solid food is treated while it is charged in a retainer and the top of the retainer remains opened. Therefore, this permits efficient heating and temperature raise of the solid food within a short period of time because of the direct contact between steam and the food and of course permits the elimination of over cooked smell of the food. The cooling of the solid food can likewise be efficiently performed within a short period of time since the cooling air and/or cooling water shower come in direct contact with the food. For this reason, the sterilization, through heating, and cooling processes can be completed within a short period of time according to the present invention. Consequently, excess softening and/or destruction of the solid foods as well as any deterioration thereof due to decomposition and alteration of the nutritive substances and flavoring substances present therein can be limited to the lowest possible level.

Furthermore, the use of a retainer having a plurality of holes at least on the bottom thereof can ensure the direct contact between steam and the solid food to be processed and this permits an improvement in the heat efficiency and in turn permits effective heating of the food. Moreover, this also permits an improvement in the cooling efficiency of the cooling air and the use thereof further accelerates the drainage of unnecessary cooling water when the cooling is carried out using cooling water. Some of solid foods require a deaeration treatment prior to the sterilization through heating and the air present within the solid foods is forced out by blowing steam on the foods. In this case, the use of the retainer having a plurality of holes makes it possible to effectively force out the air remaining in the solid foods since steam upwardly or downwardly blown on the foods can pass through the retainer. In this case, it is preferred to blow saturated steam of 100° C. on the solid food at a rate and an amount sufficient for forcing out the air in the food, for about 30 seconds to about 3 minutes. As a result, the whole of the solid food in the retainer is uniformly and rapidly heated and thus a reliable sterilization effect by heating would be expected. Therefore, it is not necessary to set an excess safety factor to the sterilization through heating and this permits the elimination of any possibility of overheating of the solid food.

In the method of the present invention, after the completion of the cooling treatment, the solid food contained in the retainer is transferred to a sterilized packaging container and then aseptically sealed in the container. In this respect, the sterilization of the packaging container may be performed according to any conventionally known method. Moreover, the packaging container must not withstand the conditions for retort and may be those having heat resistance lower than that required for the packaging materials for retort. Therefore, a wide variety of packaging containers may be used in the present invention for packing the solid foods. Among these, preferably used are packaging containers of polypropylene. Since the solid food in a retainer is transferred to a sterilized packaging container as has been discussed above, the packaging container does not become dirty and the container must not withstand the conditions for retort. Moreover, the method of the present invention permits packaging of the solid food in retainers in an amount required for one searving unit and the method also allows easy handling of the solid food. In other words, the method permits the elimination of operations required for weighing and dispensing the solid food within a sterilized atmosphere after the sterilization through heating. In particular, the inner surface of the retainer is preferably covered with Teflon-lining so that the sterilized solid food is not adhered to the inner wall of the retainer.

According to the present invention, the sterilized solid food is aseptically sealed in a packaging container after transferring it from the retainer to the sterilized packaging container. The aseptic sealing can be carried out in a sterile room according to the ordinary method. After transferring the sterilized food to a sterilized packaging container, liquid sauce, seasoning liquid or the like separately sterilized may additionally be added to the packaging container before sealing the container. This enables the production of aseptically packaged foods each comprising a combination of solid and liquid ingredients each of which is separately processed under the optimum sterilizing conditions. In addition, the sealing operation using a lid is carried out while flushing nitrogen gas in the container and this can thus permit the production of a packaged food having a longer shelf-life.

As has been discussed above in detail, the present invention permits efficient and rapid heating and temperature-raising of a solid food because of the direct contact between steam and the food without causing a problem such that the packaging container becomes dirty during the sterilization through heating and does not suffer from a problem of giving out a over cooking smell. Moreover, the method likewise permits efficient and rapid cooling of the food because of the direct contact between cooling air and/or cooling water and the solid food. In other words, the method allows the completion of the sterilization through heating and the cooling step within a short period of time. For this reason, excess softening and/or destruction of the solid foods as well as any deterioration thereof due to decomposition and alteration of the nutritive substances and flavoring substances present therein can be limited to the lowest possible level.

Moreover, a wide variety of packaging materials of the containers can be used in the present invention since the present invention does not require the use of packaging containers having characteristic properties which make the containers resistant to the pressurized heat sterilization. More specifically, the method of the present invention is not accompanied by any softening and deformation of the packaging container and therefore, the present invention allows the use of packaging containers having delicate morphological characteristics.

The present invention will hereinafter be described in more detail with reference to the following non-limitative working Examples.

EXAMPLE 1

Cooked Rice (Chinese Fried Rice)

Cleansed rice was immersed in water for one hour and then steamed at 100° C. (saturated steam) for 10 minutes, while adding water by intermittently spraying warmed water on the rice. As a result, the water content of the rice grains became about 58%. Then the cleansed rice was further steamed for additional 40 minutes to perform preliminary cooking through heating. Subsequently, 500 g of the preliminarily cooked rice was fried for 3 minutes together with 50 g of roast pork (pieces of 6 mm square), 50 g of dried mushroom reconstituted with water (pieces of 7 to 8 mm square), 50 g of scrambled egg, 25 g of green peas, 25 g of Welsh onion (cut into tiny pieces), 5 g of ginger (cut into tiny pieces) and 25 g of seasonings in the presence of 75 g of salad oil. The cooked fried rice thus obtained (about 200 g) was charged in a retainer in the form of a layer having an approximately uniform thickness.

The retainer used in this Example was a stainless steel retainer having a diameter of 140 mm ($\phi$), a depth of 55 mm and a circular cross section and holes having a diameter of 2.5 mm were formed on the bottom thereof so that the overall area of the holes was 51% of the whole area of the bottom.

Then the rice was deaerated by upwardly passing, through the ricchamntained in the retainer, steam at a rate and in an amount sufficient for forcing out the air present therein (saturated steam of 100° C.; for 30 seconds). Thereafter, the retainer was introduced into a pressurized heating chamber and sterilized at 130° C. for 2 minutes and 40 seconds using saturated steam. As a result, the water content of the rice grains was almost identical to that observed before the sterilization (showing an increase of only about 1%). In this regard, the conditions for sterilization would vary depending on the size of ingredients included, but were controlled so as to ensure the lowest Fo value on the order of 4 even at the center of the solid content (the same is true for the following Examples).

The rice was then transferred from the pressurized heating chamber to a cooling chamber in which the rice was cooled for 5 minutes in an aseptic atmosphere, followed by transferring the retainer from the cooling chamber to a room in which a packaging machine was placed in an aseptic atmosphere, then transferring the solid content in the retainer to a separately sterilized packaging container of polypropylene and aseptically sealing the container to give container-packaged chinese fried rice.

EXAMPLE 2

Noodles

Raw noodles were prepared according to the usual method (water content thereof was found to be about 30%). The raw noodles were preliminarily steamed at atmospheric pressure and 100° C. for 70 seconds (water content thereof was found to be about 33%). The wad of the noodles was disentangled through pulling and a small amount of an oil (2%) was applied onto the surface of the noodles.

The noodles which had thus been preliminarily cooked through heating were cut into wads (120 g each for one searving unit) and charged in a retainer identical to that used in Example 1 in the form of a layer having an approximately uniform thickness.

Then the noodles were deaerated by upwardly passing, through the noodles contained in the retainer, steam at a rate and in an amount sufficient for forcing out the air present therein (saturated steam of 100° C.; for 30 seconds). Thereafter, the retainer was introduced into a pressurized heating chamber and sterilized therein at 130° C. for 2 minutes using saturated steam.

The retainer was then transferred from the pressurized heating chamber to a cooling chamber in which sterilized water was sprayed on the noodles for a predetermined time in an aseptic atmosphere in order to cool the noodles and make up moisture thereof and the moisture content of the noodles was found to be about 55%.

Then the noodles were further cooled to a desired temperature using sterilized cooling air, followed by moving the noodles in a disentangling machine to thus release the wad of the noodles from the retainer, transferring the retainer from the cooling chamber to a room in which a packaging machine was placed in an aseptic atmosphere, then transferring the solid content in the retainer to a separately sterilized packaging container of polypropylene and aseptically sealing the container to give container-packaged noodles.

EXAMPLE 3

Pasta (Base for Macaroni Salad)

Macaroni prepared by the usual method was boiled to such an extent that it was still slightly hard by slightly reducing the boiling time (about 7 minutes). Then salad oil was added to the macaroni in an amount of 1% (by weight) based on the weight of the latter to prevent mutual sticking thereof. Carrot was cut into thin rectangular pieces (1 cm×3 cm), onion was likewise cut into pieces of 1 cm square, shelled shrimps were gutted and these ingredients were then boiled for about 30 seconds in boiling water. Then these pre-treated ingredients were mixed with the macaroni at a ratio, macaroni: carrot: onion: shelled shrimps, of 100:40:60:50. The base for salad thus preliminarily cooked (about 200 g) was charged into a retainer identical to that used in Example 1 in a layer having an approximately uniform thickness.

Then the pasta was deaerated by upwardly passing, through it contained in the retainer, steam at a rate and in an amount sufficient for forcing out the air present therein (saturated steam of 100° C.; for one minutes). Thereafter, the retainer was introduced into a pressurized heating chamber and sterilized at 130° C. for 90 seconds using saturated steam.

The pasta was then transferred from the pressurized heating chamber to a cooling chamber in which it was cooled for 5 minutes in an aseptic atmosphere, followed by transferring the retainer from the cooling chamber to a room in which a packaging machine was placed in an aseptic atmosphere, then transferring the solid content in the retainer to a separately sterilized packaging container of polypropylene and aseptically sealing the container to give a container-packaged base for macaroni salad.

EXAMPLE 4

Vegetable-Meat and Processed Products Thereof (Beef Stew)

After peeling, a potato was cut into dice of about 2 cm cube, followed by a blanching treatment through heating for about 5 minutes in boiling water and then allowing to stand at room temperature for cooling. On the other hand, carrot was peeled and then randomly cut into pieces having a size of about 2 cm. Beef was cut into pieces having a size of 3 cm, then heated and fried in a direct-heating type frying-pan in the presence of lard till the pieces were burnt brown. Mushroom (whole) was provided by opening the can, removing the liquid phase to separate only the solid content thereof. The solid ingredients thus prepared were charged into retainers identical to that used in Example 1 (40 g of beef, 25 g of carrot, 75 g of potato and 20 g of mushroom per one retainer) in a layer having an approximately uniform thickness.

Then each retainer was introduced into a pressurized heating chamber and sterilized therein at 130° C. for 8 minutes using saturated steam. Each retainer was then transferred from the pressurized heating chamber to a cooling chamber in which it was cooled for 5 minutes in an aseptic atmosphere by spraying sterilized water on the retainer and then blowing sterilized cooling air of 25° C. for 2 minutes and, after the cooling operation was completed, the excess water present therein was drained.

Each retainer was then transferred to a room in which a packaging machine was placed in an aseptic atmosphere, followed by transferring the solid content in the retainer to a separately sterilized packaging container of polypropylene and charging, into the container through the upper opening thereof, 200 g of sauce demi glace which had been separately sterilized at 137° C. for 4 seconds in a tubular heat exchanger and then cooled. The temperature of the sauce demi glace is desirably not less than 40° C. since this permits good adaptation of the flavor and taste of the sauce to the solid content. Thereafter, the container was aseptically sealed and packaged using a sterilized capping material to give container-packaged beef stew.

EXAMPLE 5

Vegetable-Meat and Processed Products Thereof
(Meat Ball Curry)

Meat balls were fried in rapeseed oil and onion was cut to a width of 2 to 3 cm and stir fried in the presence of rapeseed oil. Carrot and potatoes were treated in the same manner used in Example 4. The same procedures used in Example 4 were repeated using the solid ingredients thus prepared except that curry sauce was used instead of the sauce demi glace to give container-packaged meat ball curry.

What is claimed is:

1. A method for sterilizing and packaging a solid food having a layer of substantially uniform thickness comprising the steps of charging a solid food in a retainer having an open upper portion; sterilizing the retainer through heating; cooling the retainer with cooling air and/or cooling water; transferring the solid food contained in the retainer to a sterilized packaging container; and then aseptically sealing the container, wherein a plurality of holes having a size such that the solid food cannot pass therethrough are formed on the bottom and the side wall of the retainer.

2. The method of claim 1 wherein the solid food contained in the retainer is subjected to a pre-treatment prior to the sterilization through heating which comprises deaerating the food by upwardly or downwardly blowing saturated steam on the retainer at atmospheric pressure.

3. The method of claim 1 wherein the sterilization by heating is carried out using pressurized steam or superheated steam.

4. The method of claim 1 wherein the sterilization by heating is carried out at a temperature ranging from 110° to 135° C.

5. The method of claim 1 wherein the solid food is preliminarily cooked through heating prior to the sterilization treatment.

6. A method for sterilizing and packaging a solid food comprising the steps of:

a) charging a solid food in a retainer in a layer having an approximately uniform thickness, in which the retainer has an opened-upper portion and a plurality of holes having such a size that the solid food cannot pass therethrough which are formed on the bottom and the side wall of the retainer, the sum of the areas of said plurality of holes ranging from 10% to 60% of the entire area of the bottom of the retainer;

b) subjecting the solid food contained in the retainer to a pre-treatment which comprises deaerating the food by upwardly or downwardly blowing saturated water vapor on the retainer at atmospheric pressure;

c) sterilizing the retainer through heating at a temperature ranging from 110° to 135° C. using pressurized steam or superheated steam;

d) cooling the retainer with cooling air and/or cooling water, e) transferring the solid food contained in the retainer to a sterilized packaging container and;

f) aseptically sealing the container.

* * * * *